(No Model.)

W. L. CLARK.
NUT AND BOLT LOCK.

No. 548,152.  Patented Oct. 15, 1895.

Witnesses:
E. R. Shipley.
C. M. Shinhan?

Walter L. Clark
Inventor
by James W. See
Attorney

UNITED STATES PATENT OFFICE.

WALTER L. CLARK, OF NEW YORK, N. Y., ASSIGNOR TO THE VIBRATION-PROOF NUT COMPANY, OF NEW YORK.

NUT AND BOLT LOCK.

SPECIFICATION forming part of Letters Patent No. 548,152, dated October 15, 1895.

Application filed March 18, 1895. Serial No. 542,121. (No model.)

*To all whom it may concern:*

Be it known that I, WALTER L. CLARK, of New York, New York county, New York, have invented certain new and useful Improvements in Nut and Bolt Locks, of which the following is a specification.

My improvement in nut and bolt locks will be readily understood from the following description, taken in connection with the accompanying drawings, in which—

Figure 1:
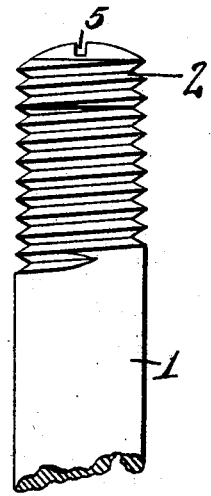
Figure 2:
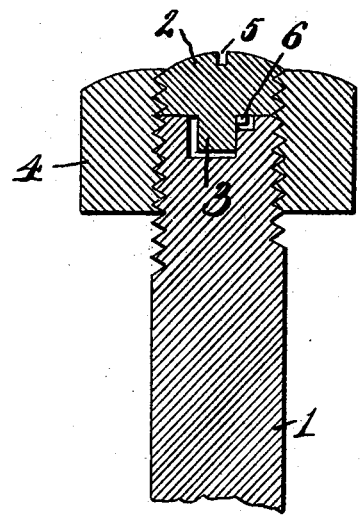
Figure 3:
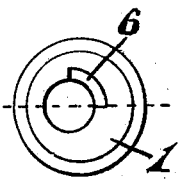
Figure 4:
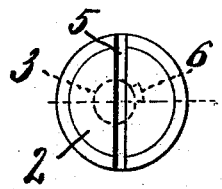

Figure 1 is a side elevation of a bolt embodying my improved nut-lock; Fig. 2, a vertical section of the same with nut applied; Fig. 3, a plan of the bolt, and Fig. 4 a plan of the locking-cap.

In the drawings, 1 indicates an ordinary threaded bolt; 2, a cap-piece thereon forming a prolongation of the threaded portion of the bolt; 3, a projection from the cap-piece down into a recess in the end of the bolt, this projection being a cam, the drawings illustrating the projection as a plain eccentric boss fitting into an eccentric recess in the end of the bolt; 4, the nut having no peculiarities, the nut engaging the threads of the bolt and the threads of the cap-piece, the cap-piece having but few threads, two or three being all-sufficient; 5, a slot in the upper face of the cap-piece to receive a screwdriver; and 6, a pin-and-groove arrangement of obvious construction to limit the rotation of the cap-piece with reference to the bolt, the limit being such that the cap-piece cannot be turned to the right, (in the case of a right-hand screw,) so as to throw the exterior of the cap-piece into eccentric relation to the bolt.

The cap-piece being on the bolt, as in Fig. 1, the nut may be screwed on as usual to the position shown in Fig. 2. The cap-piece in this action forms simply a concentric threaded prolongation of the bolt, the stop 6 preventing the turning of the cap-piece to non-concentric position. The nut having been screwed to place and an attempt being made to unscrew the nut, the friction of the threads on the cap-piece will tend to turn the cap-piece to the left. The action of the cam projection 3 is to quickly throw the cap-piece into eccentric relation to the body of the bolt and forcibly jam the threads at one side of the cap-piece and the threads at the opposite side of the bolt into the threads of the nut, thus locking the nut and preventing its unscrewing, and the greater the force applied to turn the nut the more firm becomes the locking; but if when the nut is to be unscrewed a screwdriver be inserted in slot 5 to hold the cap-piece in normal relation to the bolt, then the cam will be inoperative, and no jamming or locking will take place. The pin-and-groove arrangement 6 is a mere expedient to hold the cap-piece in concentric relation to the bolt when the nut is being applied, and any equivalent stop arrangement will answer the purpose. It may even be omitted entirely if a screwdriver be employed to prevent the turning of the cap-piece to jamming position while the nut is being applied; but a stop arrangement is to be recommended in all cases.

The eccentric boss 3 and its recess in the bolt may of course be transposed by having the boss on the bolt and the recess in the cap-piece.

It is to be understood that slot 5 is a mere exemplary expedient for permitting an implement to be applied to the cap-piece to hold it against undesirable rotation.

It is to be observed that cam-projection 3 when in action and under strain acts against but one surface or side of the recess in the bolt, and that therefore it is not necessary that the recess fit the cam neatly.

I claim as my invention—

In a nut and bolt lock, the combination, substantially as set forth, of a threaded bolt having a recess in its end, and a circular cap-piece threaded in correspondence with the thread of the bolt and seating against the end of the bolt and having a cam projecting into said recess.

WALTER L. CLARK.

Witnesses:
M. E. STODDART,
J. R. BEATTIE.